(12) United States Patent
Hutchins et al.

(10) Patent No.: US 8,553,960 B2
(45) Date of Patent: Oct. 8, 2013

(54) IMAGING RESOLUTION RECOVERY TECHNIQUES

(75) Inventors: Gary D. Hutchins, Carmel, IN (US); Victor Soon, West Lafayette, IN (US); Michael A. Miller, Indianapolis, IN (US)

(73) Assignee: Indiana University Research & Technology Corporation, Indianapolis, IN (US)

( * ) Notice: Subject to any disclaimer, the term of this patent is extended or adjusted under 35 U.S.C. 154(b) by 1063 days.

(21) Appl. No.: 12/541,417

(22) Filed: Aug. 14, 2009

(65) Prior Publication Data

US 2010/0040273 A1 Feb. 18, 2010

Related U.S. Application Data

(63) Continuation of application No. PCT/US2008/002339, filed on Feb. 22, 2008.

(60) Provisional application No. 60/902,678, filed on Feb. 22, 2007.

(51) Int. Cl.
*G06K 9/00* (2006.01)
*G06K 9/62* (2006.01)

(52) U.S. Cl.
USPC .......................................... 382/131; 382/132

(58) Field of Classification Search
USPC ........................................................ 382/131
See application file for complete search history.

(56) References Cited

U.S. PATENT DOCUMENTS

| | | |
|---|---|---|
| 6,351,548 B1 | 2/2002 | Basu et al. |
| 6,452,183 B1 | 9/2002 | Nambu |
| 6,603,123 B1 * | 8/2003 | Zeng .......................... 250/363.1 |
| 6,754,289 B2 | 6/2004 | Komiyama |
| 6,754,298 B2 * | 6/2004 | Fessler .............................. 378/4 |
| 6,858,847 B1 | 2/2005 | Macciocchi |
| 6,915,004 B2 | 7/2005 | Newport et al. |
| 6,915,005 B1 | 7/2005 | Ruchala et al. |
| 7,039,227 B2 | 5/2006 | Tanaka et al. |
| 7,046,831 B2 | 5/2006 | Ruchala et al. |
| 7,049,616 B2 * | 5/2006 | Sengupta et al. .......... 250/505.1 |
| 7,085,405 B1 | 8/2006 | Levkovitz et al. |

(Continued)

FOREIGN PATENT DOCUMENTS

WO  WO 2008/103435 A1  8/2008

OTHER PUBLICATIONS

Qi, A theoretical study of the contrast recovery and variance of MAP reconstructions from PET data, Apr. 1999, Signal & Image Process. Inst., Univ. of Southern California, Los, vol. 18, Issue: 4 pp. 293-305.*

(Continued)

*Primary Examiner* — Tran Nguyen
(74) *Attorney, Agent, or Firm* — Krieg DeVault LLP

(57) ABSTRACT

One embodiment is a unique method employing an improved image resolution recovery technique. Another embodiment is a unique system implementing an improved image resolution recovery technique. A further embodiment is a method including obtaining a sinogram based upon a measurement of an imaging system, processing the sinogram using a smoothing or fitting technique, deconvolving a system response function of the imaging system from the sinogram to provide a deconvolved sinogram, and constructing an image based upon the deconvolved sinogram. Further embodiments, forms, objects, features, advantages, aspects, and benefits shall become apparent from the following description and drawings.

29 Claims, 6 Drawing Sheets

(56) References Cited

U.S. PATENT DOCUMENTS

| | | |
|---|---|---|
| 7,173,248 B2 | 2/2007 | Ross et al. |
| 7,206,440 B2 | 4/2007 | August |
| 7,215,732 B2 | 5/2007 | Yin et al. |
| 2002/0136439 A1 | 9/2002 | Ruchala et al. |
| 2003/0076988 A1 | 4/2003 | Liang et al. |
| 2003/0108229 A1 | 6/2003 | Tanaka et al. |
| 2003/0190065 A1 | 10/2003 | Hamill et al. |
| 2004/0167387 A1 | 8/2004 | Wollenweber et al. |
| 2005/0286749 A1 | 12/2005 | DeMan et al. |
| 2006/0188134 A1 | 8/2006 | Quist |
| 2006/0215891 A1 | 9/2006 | Fessler et al. |
| 2006/0257010 A1 | 11/2006 | George et al. |
| 2006/0285737 A1 | 12/2006 | Hamill et al. |
| 2007/0036418 A1* | 2/2007 | Pan et al. .................... 382/131 |
| 2007/0290140 A1 | 12/2007 | Lenox et al. |

OTHER PUBLICATIONS

Qi, A theoretical study of the contrast recovery and variance of MAP reconstructions from PET data, Apr. 1999, Signal & Image Process. Inst., Univ. of Southern California, Los, vol. 18, Issue: 4 pp. 293-305.*
WO 2008/103435 (ISR), Aug. 8, 2008, Indiana University Research & Technology Corporation.
Koichi Ogawa, Image distortion and correction in single photon emission CT, Annuals of Nuclear Medicine, vol. 18, No. 3, 2004.
M. Menke, M.S. Atkins, K.R. Buckley, Compensation Methods for Head Motion Detected During Pet Imaging, IEEE Transactions on Nuclear Science, vol. 43, No. 1, Feb. 1996.
Stepen E. Derenzo, William W. Mose et al, Critical instrumentation issues for <2 mm resolution, high sensitivity brain PET, Brain PET 93 "ICS 1030" May 29-31, 1993 Akita, Japan.
Catherine Loader, Smoothing: Local Regression Techniques, Dept. of Statistics, Case Western University, Cleveland, OH, Handbook of Computational Statistics, 2004.
Gary D. Hutchins, W. Leslie Rogers, Ping Chiao, Raymond R. Raylman, Brian W. Murphy, Constrained Least Squares Filtering in High Resolution PET and SPECT Imaging, IEEE Transactions on Nuclear Science, vol. 37, No. 2, Apr. 1990.
Gary D. Hutchins, W. Leslie Rogers, Neal H. Clinthorne, Robert A. Koeppe, and Richard D. Hichwa, Constrained Least Squares Projection Filtering: A New Technique for the Reconstuction of Emission Computed Tomographic Images, IEEE Transactions on Nuclear Science, vol. NS-34, No. 1, Feb. 1987.
International Search Report and Written Opinion, PCT/US08/02339, Indiana University Research & Technology Corporation, The International Searching Authority/US, Jun. 25, 2008.
Koichi Ogawa, Image distortion and correction in single photon emission CT, Annals of Nuclear Medicine, vol. 18, No. 3, 171-185, 2004.
Gary D. Hutchins et al., Constrained least squares filtering in high resolution PET and SPECT imaging, IEEE Transactions on Nuclear Science, vol. 37, No. 2, Apr. 1990.
Stephen E. Derenzo et al., Critical instrumentation issues for <2 mm resolution, high sensitivity brain PET, Brain PET 93 "ICS 1030", May 29-31, 1993, Akita, Japan.
Catherine Loader, Smoothing: Local Regression Techniques, Handbook of Computational Statistics, To Appear 2004.
Gary D. Hutchins et al., Constrained least squares projection filtering: A new technique for the reconstruction of emission computed tomographic images, IEEE Transactions on Nuclear Science, vol. NS-34, No. 1, Feb. 1987.
M. Menke, Compensation Methods for Head Motion Detected During PET Imaging, IEEE Transactions on Nuclear Science, vol. 43, No. 1, Feb. 1996.

* cited by examiner

IMAGING RESOLUTION RECOVERY TECHNIQUES

CROSS REFERENCE

The present application is a continuation of PCT/US2008/002339 filed on Feb. 22, 2008, which claims the benefit of U.S. Provisional Patent Application No. 60/902,678 filed Feb. 22, 2007, each of which is incorporated herein by reference. The present application claims the benefits and the rights of priority of both aforementioned applications.

TECHNICAL FIELD

The technical field relates to imaging resolution recovery techniques operable in connection with positron emission tomography ("PET"), other tomographic imaging systems and modalities, and/or planar imaging systems and modalities such as projection x-ray systems and others.

BACKGROUND

Present approaches to PET and other imaging systems and modalities suffer from a variety of drawbacks, limitations, disadvantages and problems including those respecting image resolution, computational cost, and others. There is a need for the unique and inventive techniques, methods, and systems disclosed herein.

SUMMARY

One embodiment is a unique method employing an improved image resolution recovery technique. Another embodiment is a unique system implementing an improved image resolution recovery technique. A further embodiment is a method including obtaining a sinogram based upon a measurement of an imaging system, processing the sinogram using a smoothing or fitting technique, deconvolving a system response function of the imaging system from the sinogram to provide a deconvolved sinogram, and constructing an image based upon the deconvolved sinogram. Further embodiments, forms, objects, features, advantages, aspects, and benefits shall become apparent from the following description and drawings.

DETAILED DESCRIPTION

For purposes of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would occur to one skilled in the art to which the invention relates.

Figure 1:
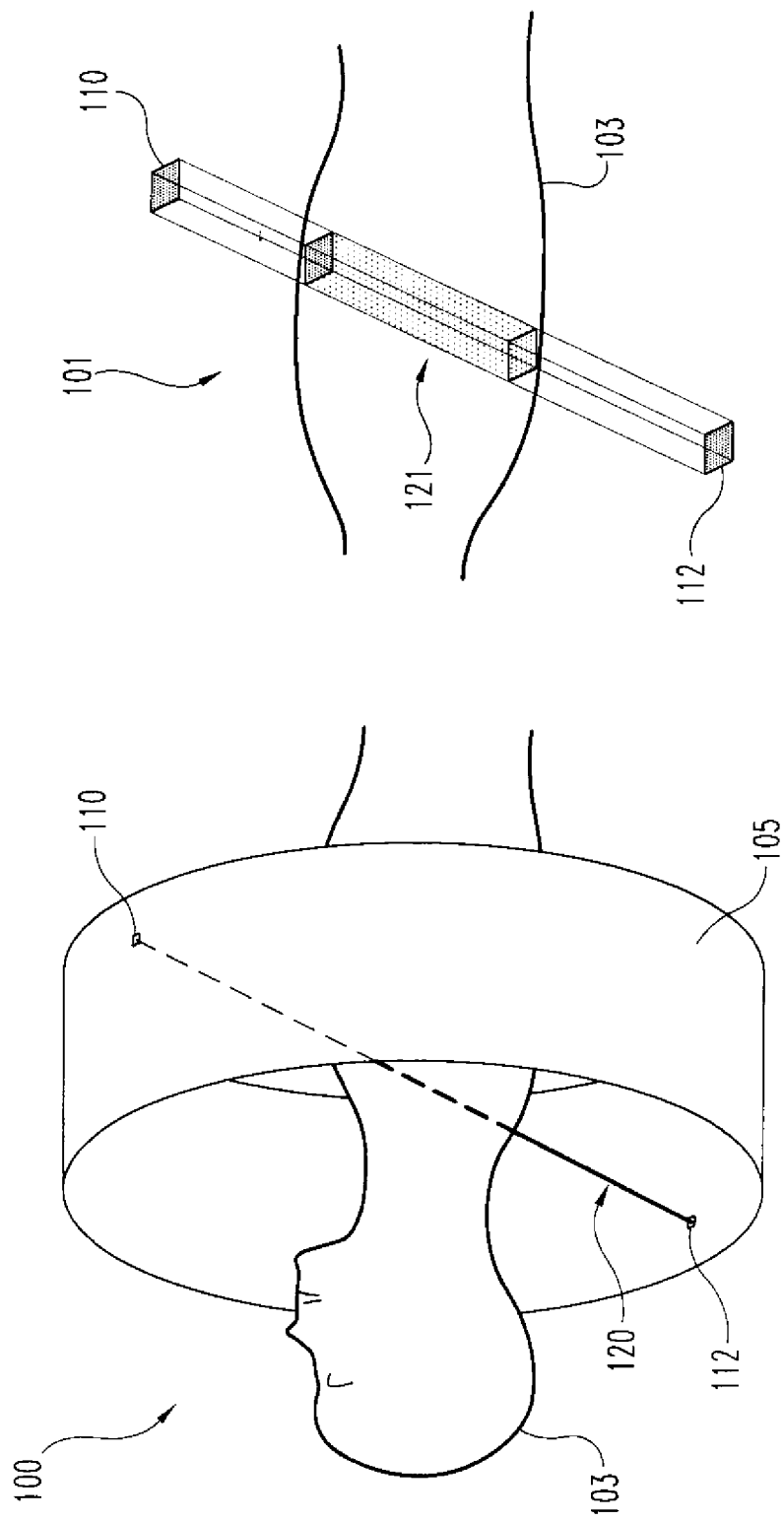
FIG. 1 is an illustration of an exemplary imaging system.

With reference to FIG. 1, there is illustrated an exemplary imaging system 100. In the illustrated embodiment, system 100 is a PET system including a detector ring 105 which includes detectors, such as detectors 110 and 112, which are operable to detect photons emitted during the annihilation of a positron and an electron. The detectors may be a scintillating crystal coupled with one or more photomultiplier tubes or silicon avalanche photodiodes, or any other detector operable to detect annihilation photons. While only detectors 110 and 112 are illustrated for purposes of clarity and simplicity, detector ring 105 includes a plurality of additional detectors which could be arranged in a variety of configurations about detector ring 105.

A patient 103 (or another object to be scanned) is positioned in detector ring 105. A compound labeled with positron emitting isotopes ("labeled compound") has been previously introduced into the patient 103. The labeled compound will emit a positron which will be annihilated when it encounters an electron. The annihilation event will emit a pair of annihilation photons which travel in opposite directions along line of response 120 and will be detected by detectors 110 and 112, respectively. Since positron annihilation produces two photons which travel in opposite directions, only coincident detection events (detection of photons by detectors at opposite ends of a line of response at very nearly the same time) are meaningful and non-coincident detection events can be ignored.

FIG. 1 further illustrates a more detailed portion 101 of PET system 100. As illustrated in portion 101, line of response 120 has a volume since detectors 110 and 112 have an area. The number of coincident detection events is proportional to the quantity of labeled compound 121 in patient 103 which is in the volume of response located between detectors 110 and 112. While system 100 is illustrated and described as a PET system, additional embodiments involve the use of other imaging systems, techniques and instrumentation including, for example, other tomographic imaging systems and modalities, and/or planar imaging systems and modalities such as projection x-ray systems and others.

Figure 2:
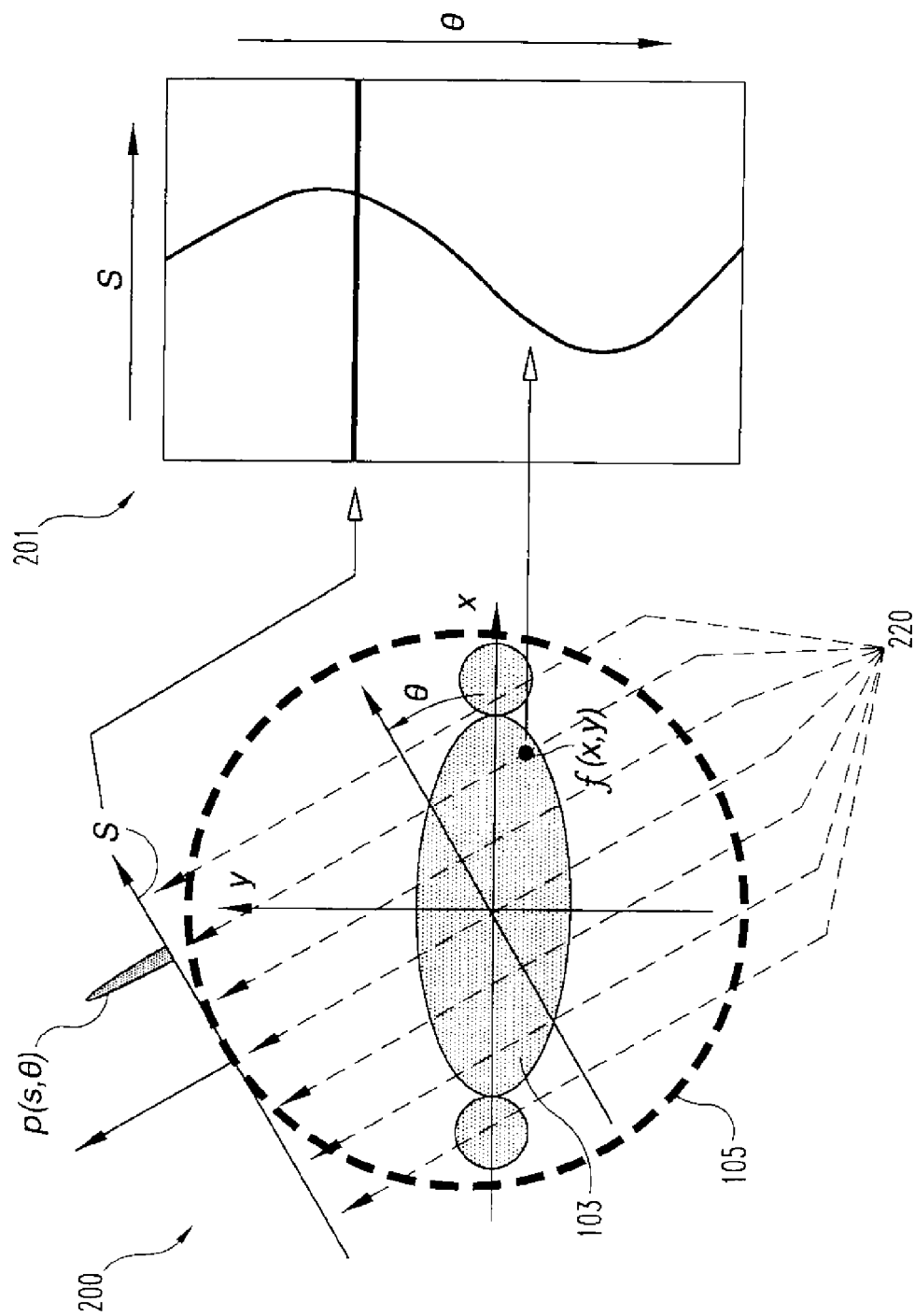
FIG. 2 is an illustration of an exemplary measurement by a imaging system and a sinogram based upon the measurement.

With reference to FIG. 2, there is illustrated a measurement 200 being taken by an exemplary PET system, such as PET system 100. Measurement 200 acquires data for a set of lines of response 220 for a given angle θ. Lines of response 220 may be organized into a projection which includes the line integrals for all s for an angle θ. Projections over the range $0 \le \theta \le 2\pi$ may be organized into sinogram 201 which is a two dimensional function of s and θ. For purposes of clarity the measurement illustrated in FIG. 2 has been greatly simplified so that only a single positron annihilation event in patient 103 (indicated by point f(x,y)) is being measured. This single annihilation event produces two annihilation photons which travel along the line of response which intersects point f(x,y) and are detected by detectors in detector ring 105. The projection of this detection is given by p(s,θ) and point f(x,y) appears as the sinusoid on sinogram 201. As stated above, this example is greatly simplified. In a typical measurement, sinogram 201 will include a superposition of all sinusoids corresponding to each point of an annihilation event in patient 103. A measured sinogram may be obtained in the foregoing manner, or in other manners of detection used in connection with other tomographic imaging systems and modalities, and/or planar imaging systems and modalities such as projection x-ray systems and others.

Figure 3:
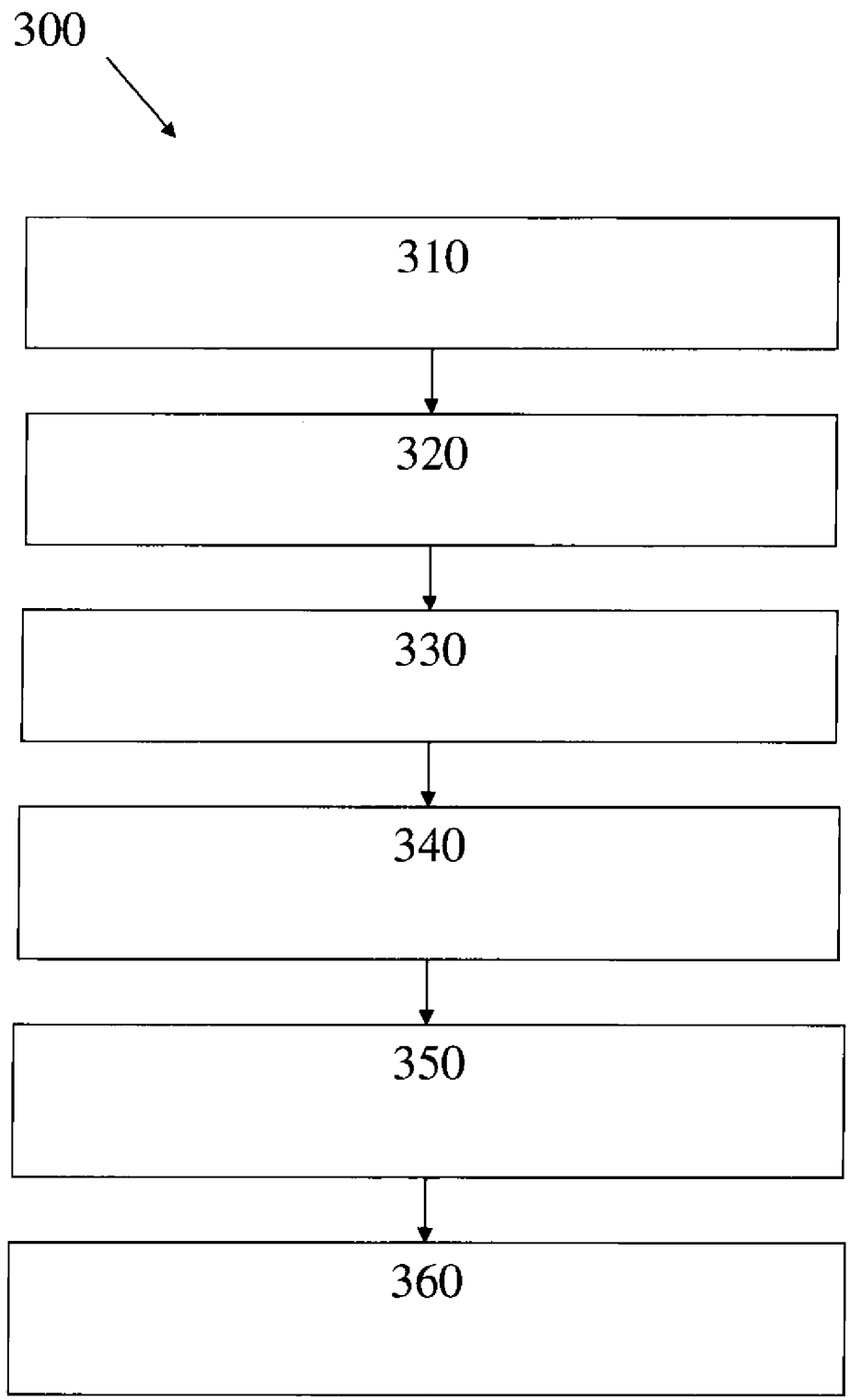
FIG. 3 is a flow diagram of an exemplary resolution recovery technique.

With reference to FIG. 3, there is illustrated a flow diagram 300 describing operations relating to a preferred resolution recovery technique. At operation 310 photon detection occurs, for example, as described above in connection with FIGS. 1 and 2. Photon detection may be accomplished using a variety of techniques, systems and instrumentation including, for example, a two dimensional PET system, a three-dimensional PET system, or a combined PET/CT system. It is also contemplated that detection other than photon detection could be accomplished using other systems, techniques and/or instrumentation such as, for example, other tomographic imaging systems and modalities, and/or planar imaging systems and modalities such as projection x-ray systems and others.

From operation 310 flow diagram 300 proceeds to operation 320 where coincidence detection occurs, for example, through coincidence detection as described above in connection with FIGS. 1 and 2. Coincidence detection may be accomplished, for example, using a coincidence processing unit which receives detection information from a detector ring and identifies coincident detection events. The coincidence processing unit and other components of the systems disclosed herein may include one or more processors, ASICs, computers, computer readable memories or combinations thereof. The computer readable memories may be configured to store executable instructions which may be created or programmed using a variety of programming languages, compilers, and tools. It is also contemplated that detection other than coincidence detection could be accomplished using other systems, techniques and/or instrumentation such as, for example, other tomographic imaging systems and modalities, and/or planar imaging systems and modalities such as projection x-ray systems and others.

From operation 320 flow diagram 300 proceeds to operation 330 where a measured sinogram is generated, constructed, and/or stored in a computer readable memory. Generation of a measured sinogram may be accomplished, for example, using one or more processors, ASICs, computers or combinations thereof. In a preferred embodiment, a measured sinogram $p(s,\theta,z)$ is obtained, where $p(s,\theta,z)$ is a set of measured projections, for example, a set of coincident detector responses, s is the projection position, $\theta$ is the projection angle, and z is the axial (slice) distance. The measured sinogram includes the transverse component of the system response function is $l(s)$ where $l(s)$ is independent of $\theta$ and is an even function of s. There is also an ideal sinogram $q(s,\theta,z)$ whose estimate may be calculated and used to construct an enhanced resolution image. The measured sinogram is a function of the convolution of the transverse component of the system response function and the ideal sinogram which can be expressed according to Equation 1:

$$p(s, \theta, z) = \int_{-\infty}^{+\infty} l(\tau) q(s - \tau, \theta, z) d\tau$$

From operation 330 flow diagram 300 proceeds to operation 340 where a smoothing or fitting technique is applied to the measured sinogram. The smoothing or fitting technique is preferably operable to reduce noise associated with the sinogram and/or to improve resolution of the sinogram. Operation 340 and subsequent operations may be performed in an image processing or reconstruction system which may include one or more processors, ASICs, computers, or combinations thereof. Preferably the technique applied at operation 340 is a non-parametric fitting technique. More preferably the technique applied at operation 340 is a two dimensional local regression. In a most preferred embodiment, a two dimensional local regression technique is applied to the projection of the measured sinogram along its projection s axis and the slice distance z axis. This is done for all projection angles and yields a sinogram estimate $\hat{p}(s,\theta,z)$ with reduced noise and improved data consistency. This technique can be performed by selecting coefficient estimates $\hat{c},\hat{a}_1,\hat{a}_2,\hat{b}_1,\hat{b}_2,\hat{d}$ to minimize the summation given by Equation 2:

$$\sum_{j=1}^{M} \sum_{i=1}^{N} W\left(\frac{s_i - s}{h}, \frac{z_j - z}{h}\right) \begin{pmatrix} p(s_i, \theta, z_j) - c - a_1(s_i - s) - \\ a_2(s_i - s)^2 - b_1(z_j - z) - \\ b_2(z_j - z)^2 - d(s_i - s)(z_j - z) \end{pmatrix}^2$$

for $s-h \leq s_i \leq s+h$ and $z-h \leq z_j \leq z+h$. $W(\alpha,\beta)$ is a 2 dimensional weighting function which is non-zero for $|\alpha| \leq 1.0$ and $|\beta| \leq 1.0$, and zero elsewhere. h can be viewed as the local neighborhood-size parameter. The regression estimate $\hat{p}(s_f,\theta,z_f)$ at the point $(s_f,\theta,z_f)$ is equal to $\hat{c}$ which minimizes Equation 2 at the point $s=s_f, z=z_f$. Thus, a fit is most preferably performed in two dimensions. In other embodiments, other techniques may be applied to a measured sinogram, for example, a two dimensional Hanning filter, a two dimensional Butterworth filter, a two dimensional low pass cosine filter, a two dimensional Weiner filter, or another two dimensional filter.

From operation 340 flow diagram 300 proceeds to operation 350. At operation 350 a deconvolving operation is performed. At operation 350 an estimate of the ideal sinogram $q(s,\theta,z)$ can be obtained, for example, by using Equation 4 or Equation 5 to calculate an approximation or estimate for the ideal sinogram $q(s,\theta,z)$.

Within a local range, a sinogram may be approximated by its Taylor series expansion. In a preferred embodiment a second order Taylor series expansion is performed. In additional embodiments, higher order Taylor series expansions may be utilized. The sinogram can be expressed as a Taylor series expansion expanded around s according to Equation 3:

$$p(s, \theta, z) \cong q(s, \theta, z) + \frac{1}{2} \frac{d^2 q(s, \theta, z)}{ds^2} \int_{-\infty}^{+\infty} \tau^2 l(\tau) d\tau + \frac{1}{4!} \frac{d^4 q(s, \theta, z)}{ds^4} \int_{-\infty}^{+\infty} \tau^4 l(\tau) d\tau$$

Since the transverse component of the system response function is assumed to be even, the odd higher order Taylor series expansion terms are all zero. Noting that the sinogram estimate is a good approximation of the ideal sinogram, a substitution of the derivative of p for the derivative of q can be made and an estimate of the ideal sinogram can be expressed according to Equation 4:

$$q(s, \theta, z) \cong p(s, \theta, z) - \frac{m_2}{2} \frac{d^2 p(s, \theta, z)}{ds^2}$$

where $m_2$ is the second order moment of the transverse component of the system response function. In another embodiment, an estimate of the ideal sinogram can be expressed according to Equation 5:

$$q(s, \theta, z) \cong p(s, \theta, z) - \frac{m_2}{2} \frac{d^2 p(s, \theta, z)}{ds^2} + \left(\frac{m_2^2}{4} - \frac{m_4}{24}\right) \frac{d^4 p(s, \theta, z)}{ds^4}$$

where $m_2$ is the second order moment of the transverse component of the system response function and $m_4$ is the fourth order moment of the transverse component of the system response function. An estimate for the ideal sinogram can be obtained by using the second order derivative of the measured sinogram projections and the second order moment of the transverse component of the system response function which can be measured and/or modeled, for example, as a Gaussian with a certain full width at half maximum ("FWHM"), or a Laplacian with a certain FWHM that can be selected according to the FWHM of the particular imaging system in use. If desired, the fourth order derivative of the measured sinogram projections and the fourth order moment of the transverse component of the system response function can be used to provide correction up to the fourth order. Additional embodiments contemplate an estimate for the ideal sinogram can be obtained by using the higher order derivatives and moments.

From operation 350 flow diagram 300 proceeds to operation 360. At operation 360 image construction is performed using the estimate of the ideal sinogram $q(s,\theta,z)$. In a preferred embodiment image construction is accomplished using a back projection technique, preferably a filtered back projection technique. Further embodiments contemplate the use of alternate or additional techniques of image reconstruction.

Equations 4 and 5 can be generalized for the case where the axial component of the system response function $h(z)$ is also included along with the transverse component of the system response function $l(s)$ such that the measured sinogram is expressed in Equation 6:

$$p(s, \theta, z) = \int_{-\infty}^{+\infty} \int_{-\infty}^{+\infty} l(\tau) h(\zeta) q(s - \tau, \theta, z - \zeta) d\tau d\zeta$$

The generalization can be expanded using the Taylor series expansion (extended to 2 dimensions) around s and z and the result can be expressed according to Equation 7:

$$q(s, \theta, z) \cong p(s, \theta, z) - \frac{m_{L2}}{2} \frac{d^2 p(s, \theta, z)}{ds^2} - \frac{m_{H2}}{2} \frac{d^2 p(s, \theta, z)}{dz^2}$$

where $m_{L2}$ is the second order moment of the transverse component of the system response function, $l(s)$ and $m_{H2}$ is the second order moment of the axial component of the system response function, $h(z)$. An estimate for the ideal sinogram can be obtained by using the second order derivatives of the measured sinogram along the axial and transverse axes, and the second order moments of the transverse and axial components of the system response function.

Additional embodiments contemplate variations on the operations described in connection with flow diagram 300. In certain embodiments, operation 310 is not performed and input for operation 320 is provided or received form another source. In certain embodiments, operation 320 is not performed and input for operation 330 is provided or received form another source. In certain embodiments, operation 330 is not performed and input for operation 340 is provided or received form another source. In certain embodiments, operation 340 is not performed and deconvolution at operation 350 may be performed on the output of operation 330. In certain embodiments, operation 350 is not performed and an image is constructed at operation 360 from the output of operation 340. In certain embodiments, operation 360 is not performed and the output of operation 350 is stored or passed or transmitted to another system or location for image reconstruction or other operations. It should also be understood that techniques and operations described in connection with a measured sinogram, p, could be performed in connection with a smoothed or fitted sinogram estimate, $\hat{p}$, and that techniques and operations described in connection with a smoothed or fitted sinogram estimate $\hat{p}$, could be performed in connection with a measured sinogram, p.

Figure 4:
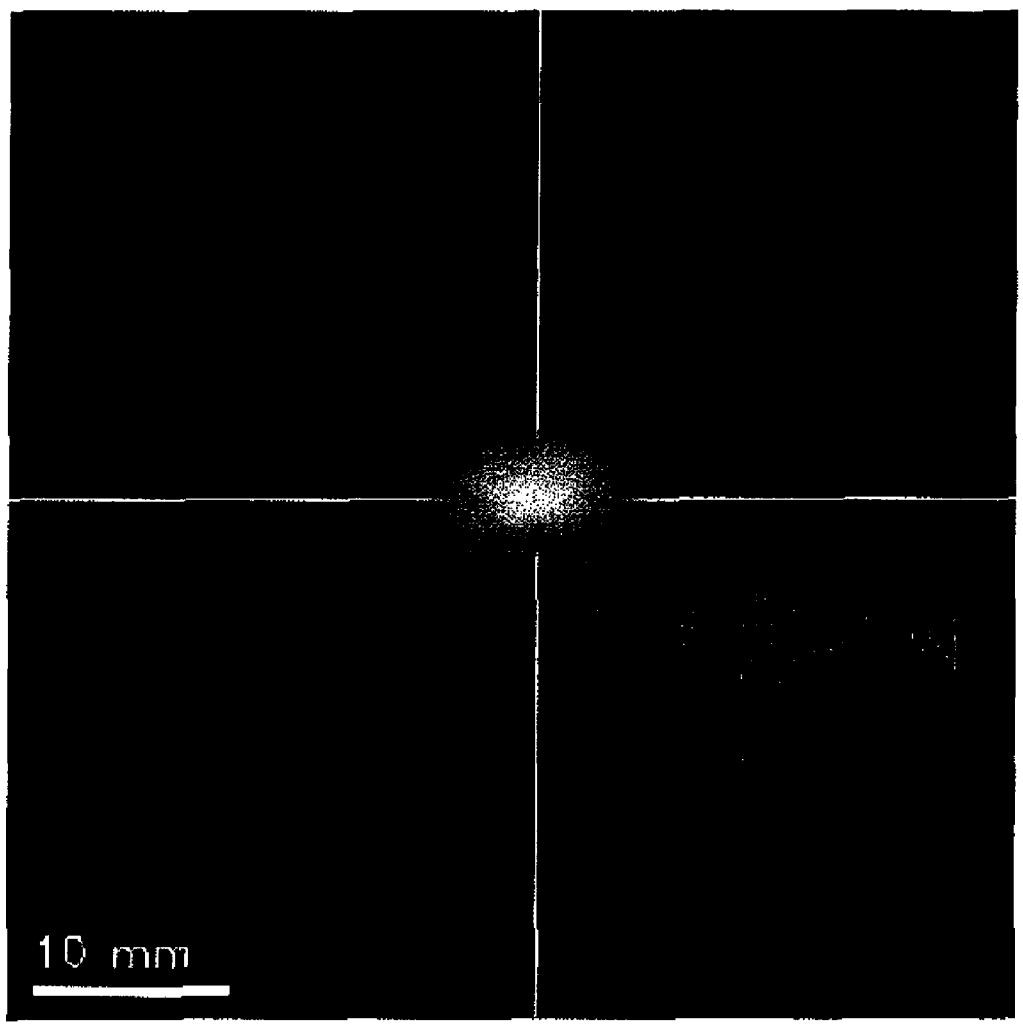
FIG. 4 is a PET image.
Figure 5:
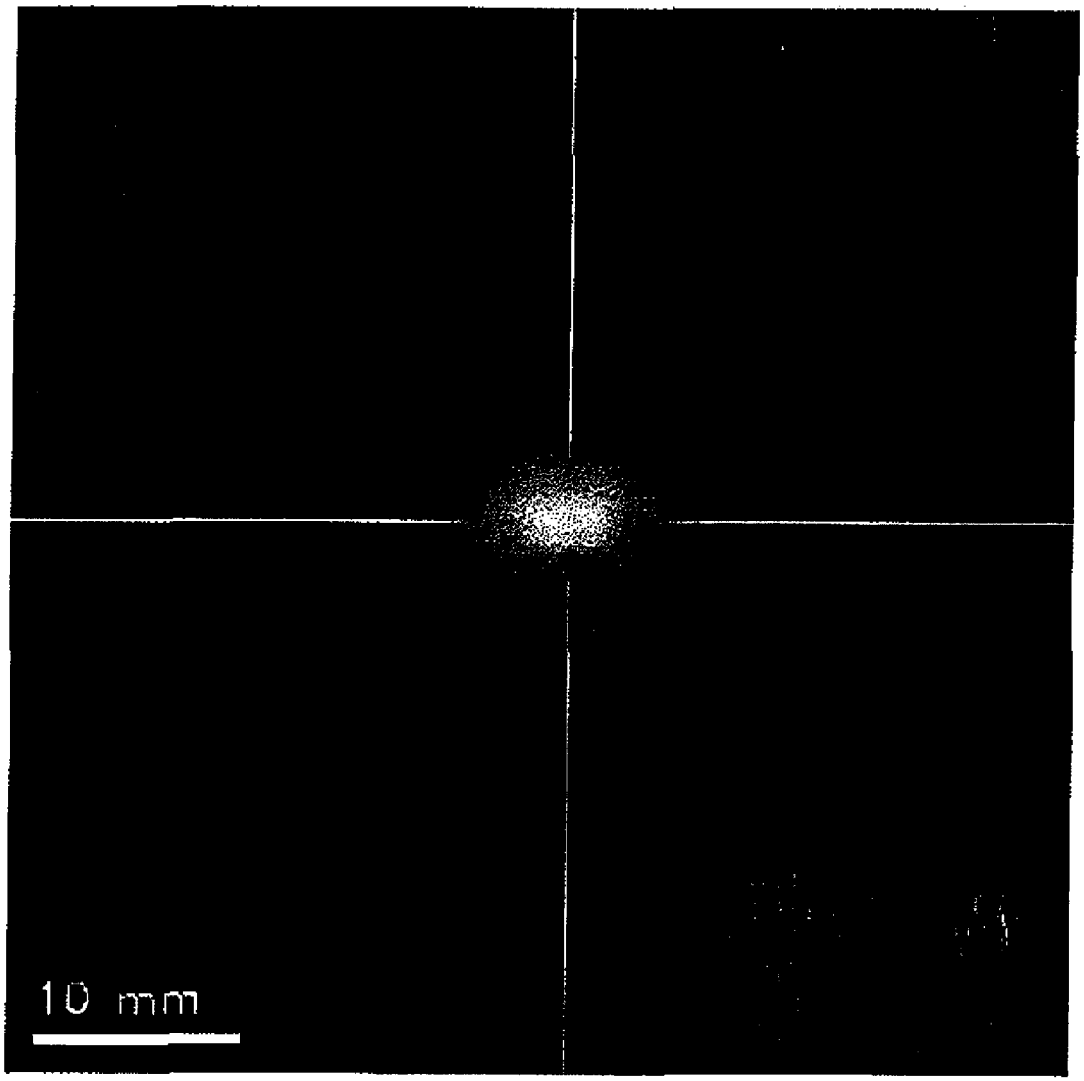
FIG. 5 is the PET image of FIG. 4 to which a two dimensional local regression technique has been applied.
Figure 6:
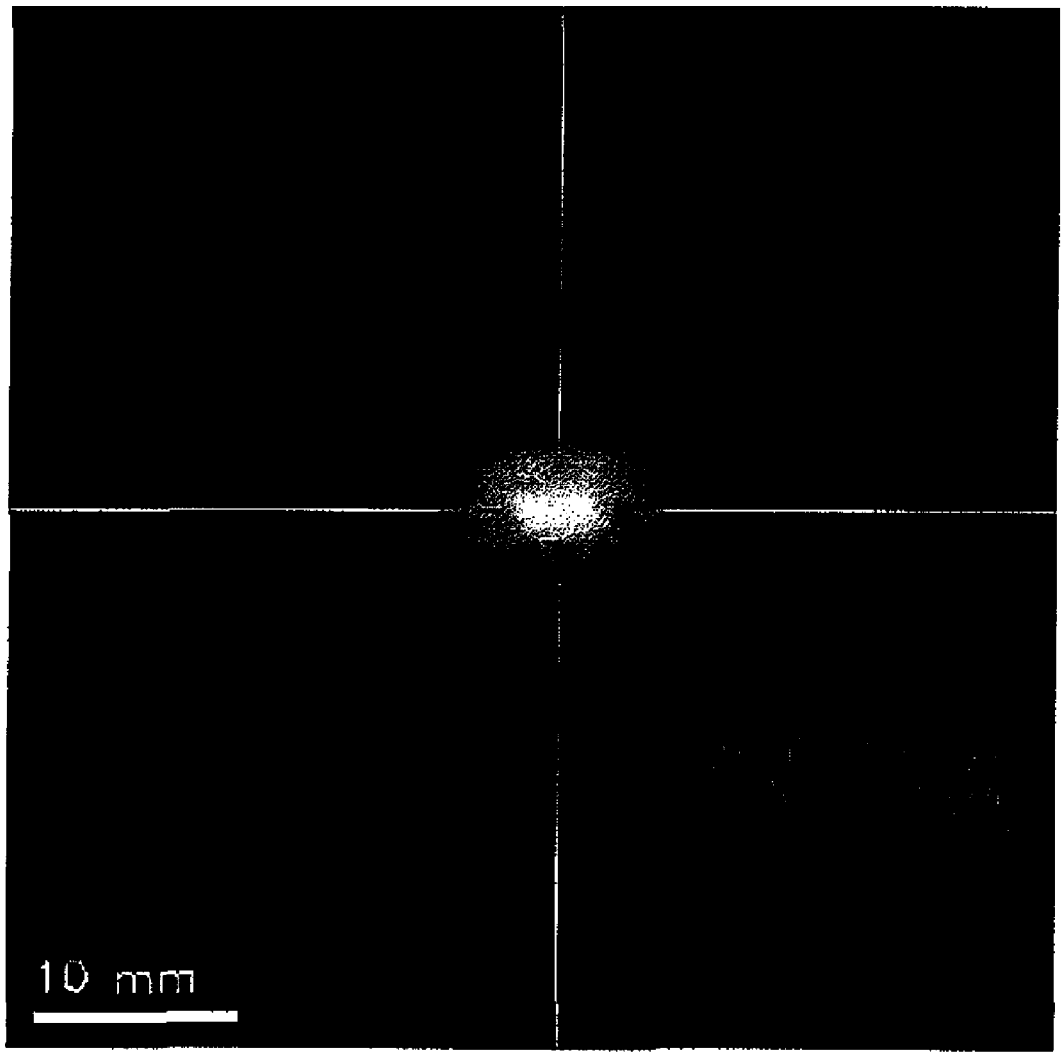
FIG. 6 is the PET image of FIG. 4 to which a two dimensional local regression and a deconvolution technique have been applied.

With reference to FIGS. 4-6, there are illustrated transaxial image slices of a mouse brain scan reconstructed from an F-18 mouse study conducted using a small animal PET scanner. The two dimensional local regression neighborhood was a 5*0.87/2 mm by 5*0.87/2 mm square. The transverse component of the system response function was modeled as a Gaussian with a FWHM of 1.5 mm. For this example, the two dimensional weighting function W is taken to be all 1.0 with h=5. With reference to FIG. 4, there is illustrated a transaxial image slice generated using filtered back projection ("FBP") using a Hanning 70% cutoff window with no two dimensional local regression post-processing. With reference to FIG. 5, there is illustrated the image slice of FIG. 4 after being fit using two dimensional local regression post-processing and a FBP ramp. With reference to FIG. 6, there is illustrated the image slice of FIG. 4 after being fit using two dimensional local regression post-processing and a FBP ramp and deconvolved from the system response.

One embodiment is a method including obtaining a sinogram based upon a measurement of an imaging system, processing the sinogram using a smoothing or fitting technique, and constructing an image based upon the sinogram.

Another embodiment is a method including obtaining a sinogram based upon a measurement of an imaging system, deconvolving a system response function of the imaging system from the sinogram to provide a deconvolved sinogram, and constructing an image based upon the deconvolved sinogram.

Another embodiment is a method including obtaining a sinogram based upon a measurement of an imaging system, processing the sinogram using a smoothing or fitting technique, deconvolving a system response function of the imaging system from the sinogram to provide a deconvolved sinogram, and constructing an image based upon the deconvolved sinogram.

In additional method embodiments the imaging system is a positron emission tomography system.

In additional method embodiments the smoothing or fitting technique is a non-parametric fitting technique.

In additional method embodiments the smoothing or fitting technique is a two dimensional local regression using weighted least squares.

In additional method embodiments the smoothing or fitting technique includes selecting coefficient estimates $\hat{c}, \hat{a}_1, \hat{a}_2, \hat{b}_1, \hat{b}_2, \hat{d}$ to minimize the summation given by:

$$\sum_{j=1}^{M} \sum_{i=1}^{N} W\left(\frac{s_i - s}{h}, \frac{z_j - z}{h}\right) \begin{pmatrix} p(s_i, \theta, z_j) - c - a_1(s_i - s) - \\ a_2(s_i - s)^2 - b_1(z_j - z) - \\ b_2(z_j - z)^2 - d(s_i - s)(z_j - z) \end{pmatrix}^2$$

for $s-h \leq s_i \leq s+h$ and $z-h \leq z_j \leq z+h$, where $W(\alpha,\beta)$ is a 2 dimensional weighting function which is non-zero for $|\alpha| \leq 1.0$ and $|\beta| \leq 1.0$, and zero elsewhere, h is the local neighborhood-size parameter, and he regression estimate $\hat{p}(s_I,\theta,z_J)$ at the point $(s_I,\theta,z_J)$ is equal to $\hat{c}$ which produced a minimization at the point $s=s_I, z=z_J$.

In additional method embodiments the deconvolving includes subtracting a term including the second order derivative of the sinogram from the sinogram.

In additional method embodiments the deconvolving includes subtracting a term including the second order moment of the system response of the imaging system from the sinogram.

In additional method embodiments the deconvolving includes calculating a solution or estimation of $$q(s, \theta, z) \cong p(s, \theta, z) - \frac{m_2}{2} \frac{d^2 p(s, \theta, z)}{ds^2}$$

for $q(s,\theta,z)$, where $m_2$ is the second order moment of the transverse component of the system response function of the imaging system, and $p(s,\theta,z)$ is the sinogram.

In additional method embodiments the deconvolving includes calculating a solution or estimation of $$q(s, \theta, z) \cong p(s, \theta, z) - \frac{m_2}{2} \frac{d^2 p(s, \theta, z)}{ds^2} + \left(\frac{m_2^2}{4} - \frac{m_4}{24}\right) \frac{d^4 p(s, \theta, z)}{ds^4}$$

for $q(s,\theta,z)$, where $m_2$ is the second order moment of the transverse component of the system response function of the imaging system, $m_4$ is the fourth order moment of the transverse component of the system response function of the imaging system, and $p(s,\theta,z)$ is the sinogram.

In additional method embodiments the deconvolving includes calculating a solution or estimation of $$q(s, \theta, z) \cong p(s, \theta, z) - \frac{m_{L2}}{2} \frac{d^2 p(s, \theta, z)}{ds^2} - \frac{m_{H2}}{2} \frac{d^2 p(s, \theta, z)}{dz^2}$$

for $q(s,\theta,z)$, where $m_{L2}$ is the second order moment of the transverse component of the system response function $l(s)$ of the imaging system, $m_{H2}$ is the second order moment of the axial component of the system response function $h(z)$ of the imaging system, and $p(s,\theta,z)$ is the sinogram.

In additional method embodiments the second order moment of the system response function of the imaging system is modeled as a Gaussian.

In additional method embodiments the Gaussian is selected to have a FWHM based upon the FWHM of the imaging system.

In additional method embodiments the deconvolving occurs after said processing.

In additional method embodiments the constructing an image utilizes a back projection technique.

In additional method embodiments the constructing an image utilizes a filtered back projection technique.

One embodiment is a system including an imaging system operable to provide a sinogram based upon a measurement of the imaging system, at least one computer readable memory configured to store first executable instructions to perform a smoothing or fitting operation on the sinogram, second executable instructions to deconvolve a system response function of the imaging system from the sinogram to provide a deconvolved sinogram and third executable instructions to construct an image based upon the deconvolved sinogram, and at least one processor operable to execute said first executable instructions, said second executable instruction, and said third executable instructions.

Another embodiment is a system including an imaging system operable to provide a sinogram based upon a measurement of the imaging system, at least one computer readable memory configured to store executable instructions to perform a smoothing or fitting operation on the sinogram and further executable instructions to construct an image based upon the deconvolved sinogram, and at least one processor operable to execute said executable instructions and said further executable instructions.

Another embodiment is a system including an imaging system operable to provide a sinogram based upon a measurement of the imaging system, at least one computer readable memory configured to store executable instructions to deconvolve a system response function of the imaging system from the sinogram and further executable instructions to construct an image based upon the deconvolved sinogram, and at least one processor operable to execute said executable instructions and said further executable instructions.

In additional system embodiments said imaging system is a positron emission tomography system.

In additional system embodiments the executable instructions to perform a smoothing or fitting operation on the sinogram include instructions to perform a non-parametric fitting technique.

In additional system embodiments the executable instructions to perform a smoothing or fitting operation on the sinogram include instructions to perform a two dimensional local regression using weighted least squares.

In additional system embodiments the executable instructions to perform a smoothing or fitting operation on the sinogram are executable to select coefficient estimates $\hat{c}, \hat{a}_1, \hat{a}_2, \hat{b}_1, \hat{b}_2, \hat{d}$ to minimize the summation given by:

$$\sum_{j=1}^{M} \sum_{i=1}^{N} W\left(\frac{s_i - s}{h}, \frac{z_j - z}{h}\right) \left( \begin{array}{c} p(s_i, \theta, z_j) - c - a_1(s_i - s) - \\ a_2(s_i - s)^2 - b_1(z_j - z) - b_2(z_j - z)^2 - \\ d(s_i - s)(z_j - z) \end{array} \right)^2$$

for $s-h \leq s_i \leq s+h$ and $z-h \leq z_j+h$, where $W(\alpha,\beta)$ is a 2 dimensional weighting function which is non-zero for $|\alpha| \leq 1.0$ and $|\beta| \leq 1.0$, and zero elsewhere, h is the local neighborhood-size parameter, and he regression estimate $\hat{p}(s_I,\theta,z_J)$ at the point $(s_I,\theta,z_J)$ is equal to $\hat{c}$ which produced a minimization at the point $s=s_I, z=z_J$.

In additional system embodiments the executable instructions to deconvolve a system response function of the imaging system from the sinogram include instructions to subtract a term including the second order derivative of the sinogram from the sinogram.

In additional system embodiments the executable instructions to deconvolve a system response function of the imaging system from the sinogram include instructions to subtract a term including the second order moment of the system response of the imaging system from the sinogram.

In additional system embodiments the executable instructions to deconvolve a system response function of the imaging system from the sinogram are executable to estimate a true sinogram by solving $$q(s, \theta, z) \cong p(s, \theta, z) - \frac{m_2}{2}\frac{d^2 p(s, \theta, z)}{ds^2}$$

for q(s,θ,z), where $m_2$ is the second order moment of the transverse component of the system response function of the imaging system, and p(s,θ,z) is the sinogram.

In additional system embodiments the executable instructions to deconvolve a system response function of the imaging system from the sinogram are executable to estimate a true sinogram by solving $$q(s, \theta, z) \cong p(s, \theta, z) - \frac{m_2}{2}\frac{d^2 p(s, \theta, z)}{ds^2} + \left(\frac{m_2^2}{4} - \frac{m_4}{24}\right)\frac{d^4 p(s, \theta, z)}{ds^4}$$

for q(s,θ,z), where $m_2$ is the second order moment of the transverse component of the system response function of the imaging system, $m_4$ is the fourth order moment of the transverse component of the system response function of the imaging system, and p(s,θ,z) is the sinogram.

In additional system embodiments the executable instructions to deconvolve a system response function of the imaging system from the sinogram are executable to estimate a true sinogram by solving $$q(s, \theta, z) \cong p(s, \theta, z) - \frac{m_{L2}}{2}\frac{d^2 p(s, \theta, z)}{ds^2} - \frac{m_{H2}}{2}\frac{d^2 p(s, \theta, z)}{dz^2}$$

for q(s,θ,z), where $m_{L2}$ is the second order moment of the transverse component of the system response function l(s) of the imaging system, $m_{H2}$ is the second order moment of the axial component of the system response function h(z) of the imaging system, and p(s,θ,z) is the sinogram.

In additional system embodiments the second order moment of the system response function of the imaging system is modeled as a Gaussian.

In additional system embodiments the second order moment of the system response function of the imaging system is modeled as a Laplacian.

In additional system embodiments said processor is configured to execute said second instructions after said first instructions.

In additional system embodiments said third instructions utilize a back projection technique.

In additional system embodiments said third instructions utilize a filtered back projection technique.

Exemplary embodiments have been described herein in relation to PET. Additional embodiments relate to other tomographic imaging systems and modalities, and/or planar imaging systems and modalities. Various embodiments of the present application include detectors, measurements, sinograms and other acts, components, elements, and features respecting each of these modalities and are not limited to a particular modality unless indicated to the contrary.

While exemplary embodiments of the invention have been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It should be understood that while the use of words such as preferable, preferably, preferred, more preferred or exemplary utilized herein indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a patient diagnostic imaging system including a detector to obtain a sinogram of a target object;
   processing the sinogram with a computer using a smoothing or fitting technique;
   deconvolving a system response function of the imaging system from the sinogram with the computer to provide a deconvolved sinogram; and
   constructing an image with the computer based upon the deconvolved sinogram;
   wherein the deconvolving includes calculating a solution or estimation of $$q(s, \theta, z) \cong p(s, \theta, z) - \frac{m_2}{2}\frac{d^2 p(s, \theta, z)}{ds^2}$$

for q(s,θ,z), where $m_2$ is the second order moment of the transverse component of the system response function of the imaging system, p(s,θ,z) is the sinogram, s is the projection position, θ is the projection angle, and z is the axial slice distance.

2. A method according to claim 1 wherein the deconvolving includes subtracting a term including the second order moment of the system response of the imaging system from the sinogram.

3. A method according to claim 2 wherein the system response function of the imaging system is modeled as a Gaussian.

4. A method according to claim 3 wherein the Gaussian is selected to have a FWHM based upon the FWHM of the imaging system.

5. A method according to claim 1 wherein the imaging system is a positron emission tomography system.

6. A method according to claim 1 wherein the smoothing or fitting technique is a non-parametric fitting technique.

7. A method according to claim 1 wherein the smoothing or fitting technique is a two dimensional local regression using weighted least squares.

8. A method according to claim 1 wherein the smoothing or fitting technique includes selecting coefficient estimates $\hat{c}, \hat{a}_1, \hat{a}_2, \hat{b}_1, \hat{b}_2, \hat{d}$ to minimize the summation given by:

$$\sum_{j=1}^{M}\sum_{i=1}^{N} W\left(\frac{s_i - s}{h}, \frac{z_j - z}{h}\right)\left(\begin{array}{c} p(s_i, \theta, z_j) - c - a_1(s_i - s) - \\ a_2(s_i - s)^2 - b_1(z_j - z) - b_2(z_j - z)^2 - \\ d(s_i - s)(z_j - z) \end{array}\right)^2$$

for s−h≤$s_i$≤s+h and z−h≤$z_j$≤z+h, where W(α,β) is a 2 dimensional weighting function which is non-zero for |α|≤1.0 and |β|≤1.0, and zero elsewhere, h is the local neighborhood-size parameter, and he regression estimate $\hat{p}(s_I,\theta,z_J)$ at the point $(s_I,\theta,z_J)$ is equal to $\hat{c}$ which produced a minimization at the point $s=s_I,z=z_J$.

9. A method according to claim 1 wherein the deconvolving includes subtracting a term including the second order derivative of the sinogram from the sinogram.

10. A method according to claim 1 wherein the target object comprises a patient.

11. A method according to claim 1 wherein the deconvolving includes calculating a solution or estimation of $$q(s,\theta,z) \cong p(s,\theta,z) - \frac{m_2}{2}\frac{d^2 p(s,\theta,z)}{ds^2} + \left(\frac{m_2^2}{4} - \frac{m_4}{24}\right)\frac{d^4 p(s,\theta,z)}{ds^4}$$

for $q(s,\theta,z)$, where $m_2$ is the second order moment of the transverse component of the system response function of the imaging system, $m_4$ is the fourth order moment of the transverse component of the system response function of the imaging system, and $p(s,\theta,z)$ is the sinogram.

12. A method according to claim 1 wherein the deconvolving includes calculating a solution or estimation of $$q(s,\theta,z) \cong p(s,\theta,z) - \frac{m_{L2}}{2}\frac{d^2 p(s,\theta,z)}{ds^2} - \frac{m_{H2}}{2}\frac{d^2 p(s,\theta,z)}{dz^2}$$

for $q(s,\theta,z)$, where $M_{L2}$ is the second order moment of the transverse component of the system response function $l(s)$ of the imaging system, $m_{H2}$ is the second order moment of the axial component of the system response function $h(z)$ of the imaging system, and $p(s,\theta,z)$ is the sinogram.

13. A method according to claim 1 wherein said deconvolving occurs after said processing.

14. A method according to claim 1 wherein said constructing an image utilizes a back projection technique.

15. A method according to claim 1 wherein said constructing an image utilizes a filtered back projection technique.

16. A system comprising:
a patient diagnostic imaging system operable to provide a sinogram based upon a measurement of the imaging system;
at least one computer readable memory configured to store first executable instructions to perform a smoothing or fitting operation on the sinogram, second executable instructions to deconvolve a system response function of the imaging system from the sinogram to provide a deconvolved sinogram, and third executable instructions to construct an image based upon the deconvolved sinogram; and
at least one processor operable to execute said first executable instructions, said second executable instruction, and said third executable instructions;
wherein the second executable instructions are executable to estimate a true sinogram by solving $$q(s,\theta,z) \cong p(s,\theta,z) - \frac{m_2}{2}\frac{d^2 p(s,\theta,z)}{ds^2}$$

for $q(s,\theta,z)$, where $m_2$ is the second order moment of the transverse component of the system response function of the imaging system, $p(s,\theta,z)$ is the sinogram, s is the projection position, $\theta$ is the projection angle, and z is the axial slice distance.

17. A system according to claim 16 wherein said imaging system is a positron emission tomography system.

18. A system according to claim 17 wherein the first executable instructions are executable to select coefficient estimates $\hat{c},\hat{a}_1,\hat{a}_2,\hat{b}_1,\hat{b}_2,\hat{d}$ to minimize the summation given by:

$$\sum_{j=1}^{M}\sum_{i=1}^{N} W\left(\frac{s_i-s}{h},\frac{z_j-z}{h}\right)\begin{pmatrix} p(s_i,\theta,z_j) - c - a_1(s_i-s) - \\ a_2(s_i-s)^2 - b_1(z_j-z) - b_2(z_j-z)^2 - \\ d(s_i-s)(z_j-z) \end{pmatrix}^2$$

for $S-h \le S_i \le S+h$ and $Z-h \le z_j \le z+h$, where $W(\alpha,\beta)$ is a 2 dimensional weighting function which is non-zero for $|\alpha| \le 1.0$ and $|\beta| \le 1.0$, and zero elsewhere, h is the local neighborhood-size parameter, and he regression estimate $\hat{p}(S_I,\theta,Z_J)$ at the point $(S_I,\theta,Z_J)$ is equal to $\hat{c}$ which produced a minimization at the point $S=S_I,Z=z_j$.

19. A system according to claim 18 wherein the second executable instructions include instructions to subtract a term including the second order derivative of the sinogram from the sinogram.

20. A system according to claim 19 wherein the second executable instructions include instructions to subtract a term including the second order moment of the system response of the imaging system from the sinogram.

21. A system according to claim 20 wherein the second executable instructions are executable to estimate a true sinogram by solving $$q(s,\theta,z) \cong p(s,\theta,z) - \frac{m_{L2}}{2}\frac{d^2 p(s,\theta,z)}{ds^2} - \frac{m_{H2}}{2}\frac{d^2 p(s,\theta,z)}{dz^2}$$

for $q(s,\theta,z)$, where $M_{L2}$ is the second order moment of the transverse component of the system response function $l(s)$ of the imaging system, $m_{H2}$ is the second order moment of the axial component of the system response function $h(z)$ of the imaging system, and $p(s,\theta,z)$ is the sinogram.

22. A system according to claim 21 wherein of the system response function of the imaging system is modeled as a Laplacian.

23. A system according to claim 22 wherein said processor is configured to execute said second instructions after said first instructions.

24. A system according to claim 23 wherein said third instructions utilize a back projection technique.

25. A system according to claim 23 wherein said third instructions utilize a filtered back projection technique.

26. A system according to claim 21 wherein the system response function of the imaging system is modeled as a Gaussian.

27. A system according to claim 20 wherein the second executable instructions are executable to estimate a true sinogram by solving $$q(s,\theta,z) \cong p(s,\theta,z) - \frac{m_2}{2}\frac{d^2 p(s,\theta,z)}{ds^2} + \left(\frac{m_2^2}{4} - \frac{m_4}{24}\right)\frac{d^4 p(s,\theta,z)}{ds^4}$$

for $q(s,\theta,z)$, where $m_2$ is the second order moment of the transverse component of the system response function of the imaging system, $m_4$ is the fourth order moment of the transverse component of the system response function of the imaging system, and $p(s,\theta,z)$ is the sinogram.

28. A system according to claim 17 wherein the first executable instructions include instructions to perform a non-parametric fitting technique.

29. A system according to claim 17 wherein the first executable instructions include instructions to perform a two dimensional local regression using weighted least squares.

* * * * *